(12) United States Patent
Acharya

(10) Patent No.: US 8,055,597 B2
(45) Date of Patent: Nov. 8, 2011

(54) METHOD AND SYSTEM FOR SUBSPACE BOUNDED RECURSIVE CLUSTERING OF CATEGORICAL DATA

(75) Inventor: Chiranjit Acharya, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 711 days.

(21) Appl. No.: 11/457,064

(22) Filed: Jul. 12, 2006

(65) Prior Publication Data

US 2007/0271278 A1 Nov. 22, 2007

Related U.S. Application Data

(63) Continuation-in-part of application No. 11/436,142, filed on May 16, 2006, now Pat. No. 7,774,288.

(51) Int. Cl.
*G06F 17/00* (2006.01)
*G06N 5/02* (2006.01)
(52) U.S. Cl. ................. 706/45; 706/46; 706/47
(58) Field of Classification Search .............. None
See application file for complete search history.

(56) References Cited

U.S. PATENT DOCUMENTS

| | | | |
|---|---|---|---|
| 6,446,061 B1 * | 9/2002 | Doerre et al. | 707/3 |
| 6,460,036 B1 | 10/2002 | Herz | |
| 6,592,627 B1 | 7/2003 | Agrawal et al. | |
| 6,886,007 B2 * | 4/2005 | Leymann et al. | 707/3 |
| 2002/0042793 A1 | 4/2002 | Choi | |
| 2003/0126561 A1 | 7/2003 | Woehler et al. | |
| 2003/0177000 A1 * | 9/2003 | Mao et al. | 704/9 |
| 2003/0217052 A1 | 11/2003 | Rubenczyk et al. | |
| 2004/0044539 A1 * | 3/2004 | Taricco et al. | 705/1 |
| 2005/0044487 A1 | 2/2005 | Bellegarda et al. | |
| 2006/0004747 A1 | 1/2006 | Weare | |
| 2006/0031217 A1 * | 2/2006 | Smith et al. | 707/5 |
| 2006/0095521 A1 | 5/2006 | Patinkin | |

OTHER PUBLICATIONS

Wiesman et al., F., "Automatic Ontology Mapping for Agent Communication", AAMAS '02, pp. 563-564, Jul. 15-19, 2002.*
Ding et al., Y., "Ontology Research and Development Part 1—A Review of Ontology Generation", Journal of Information Science, pp. 1-23, 2002.*
Uschold et al., "Ontology Reuse and Application", FOIS '98, pp. 1-15, 1998.*
U.S. Appl. No. 11/436,142, filed May 16, 2006, Acharya et al.
U.S. Appl. No. 11/457,090, filed Jul. 12, 2006, Acharya et al.
U.S. Appl. No. 11/457,095, filed Jul. 12, 2006, Acharya et al.

(Continued)

*Primary Examiner* — Jeffrey A Gaffin
*Assistant Examiner* — Adrian Kennedy
(74) *Attorney, Agent, or Firm* — Fitch, Even, Tabin & Flannery

(57) ABSTRACT

A computerized method of representing a dataset includes obtaining a dataset, the dataset defining an attribute space; decomposing the attribute space into a plurality of attribute subspaces; generating a parent taxonomy of the obtained dataset with respect to one of the plurality of attribute subspaces, the parent taxonomy organizing the obtained dataset into a plurality of data subsets; generating a child taxonomy with respect to another one of the plurality of attribute subspaces, the child taxonomy organizing each of the plurality of data subsets within the parent taxonomy into at least one data subset; iteratively repeating generating the child taxonomy until a predetermined termination condition is satisfied, wherein the child taxonomy of a preceding iteration is the parent taxonomy of the current iteration; and assigning category labels to the data subsets.

24 Claims, 5 Drawing Sheets

OTHER PUBLICATIONS

U.S. Appl. No. 11/457,103, filed Jul. 12, 2006, Acharya et al.
U.S. Appl. No. 11/457,107, filed Jul. 12, 2006, Acharya et al.
U.S. Appl. No. 11/457,115, filed Jul. 12, 2006, Acharya et al.
Non Final Office Action for U.S. Appl. No. 11/457,115 mailed Feb. 12, 2009.
Non Final Office Action from U.S. Appl. No. 11/457,090 mailed Feb. 10, 2009.
Non Final Office Action from U.S. Appl. No. 11/457,095 mailed Feb. 9, 2009.
Non Final Office Action from U.S. Appl. No. 11/457,103 mailed Feb. 9, 2009.
Non Final Office Action from U.S. Appl. No. 11/457,107 mailed Feb. 9, 2009.
Conrad, Jack G. et al., "Effective Document Clustering for Large Heterogeneous Law Firm Collections", pp. 177-187, Jan. 2005.
De Queiroz, Kevin et al., "Phylogeny as a Central Principle in Taxonomy: Phylogenetic Definition of Taxon Names", pp. 1-17, Dec. 2002.
Dhar, Vassant et al., "Discovering Interesting Patterns for Investment Decision Making with GLOWER—A Genetic Learner Overlaid with Entropy Reduction", pp. 1-30, Jan. 2000.
Examiner Interview Summary from U.S. Appl. No. 11/457,095 mailed Aug. 13, 2009.
Final Office Action for U.S. Appl. No. 11/457,090 mailed Aug. 19, 2009.
Final Office Action from U.S. Appl. No. 11/457,103 mailed Aug. 19, 2009.
Notice of Allowance for U.S. Appl. No. 11/457,095 mailed Aug. 13, 2009.
Notice of Allowance from U.S. Appl. No. 11/457,107 mailed Jul. 23, 2009.
Notice of Allowance from U.S. Appl. No. 11/457,115 mailed Aug. 25, 2009.
Lee, John W. et al., "Hierarchical Clustering Based on Ordinal Consistency", Department of Computing, Hong Kong Polytechnic University, Hung Hom, Kowloon, Hong Kong. Received Sep. 2, 2004, accepted May 16, 2005. *Pattern Recognition 38* (2005) 1913-1925.
Lee, John W., "Order Invariant Hierarchical Clustering", Department of Computing, Hong Kong Polytechnic University, Department of Rehabilitation Sciences, Hong Kong Polytechnic University, Hung Hom, Hong Kong, China, 2002 *IEEE*, 6 pgs.
USPTO, Examiner Interview Summary from U.S. Appl. No. 11/457,090 mailed Mar. 12, 2010.
USPTO, Examiner Interview Summary from U.S. Appl. No. 11/457,090 mailed Jul. 26, 2010.
USPTO, Non-Final Office Action from U.S. Appl. No. 11/457,090 mailed Dec. 22, 2009.
USPTO, Non-Final Office Action from U.S. Appl. No. 12/620,499 mailed Jul. 22, 2010.
USPTO, Notice of Allowance from U.S. Appl. No. 11/457,090 mailed Jul. 26, 2010.
USPTO, Notice of Allowance from U.S. Appl. No. 11/457,103 mailed Mar. 8, 2010.
Chiranjit, Acharya, U.S. Appl. No. 12/620,499, filed Nov. 17, 2009.
Milano, et al., "Using Ontologies for XML Data Cleaning", OTM Workshops, 2005, pp. 562-571.

* cited by examiner

| | |
|---|---|
| 402a | 8498618 |
| 402b | 0TopOntology-Company-BroadcastStation-TVTokyo |
| 402c | 0TopOntology-0Region-Asia-Japan |
| 402d | Best, Underway, Sports, GolfCategory, Golf, Art, 0SubCulture, Animation, Family, FamilyGeneration, Child, Kids, Family, FamilyGeneration, Child |
| ... | *** |
| 402n | Kids, Cartoon |
| ... | *** |
| ... | *** |
| ... | *** |
| ... | 20040410 |
| ... | 0930 |
| ... | 1000 |
| 402x | 30 |

402 encompasses 402a–402x; 404 points to 8498618; 400 labels the whole structure.

FIG. 4

METHOD AND SYSTEM FOR SUBSPACE BOUNDED RECURSIVE CLUSTERING OF CATEGORICAL DATA

This application is a continuation-in-part of U.S. application Ser. No. 11/436,142, filed May 16, 2006, entitled "CLUSTERING AND CLASSIFICATION OF CATEGORY DATA" to Acharya et al., which is incorporated in its entirety herein by reference.

BACKGROUND

1. Field of Invention

Embodiments of the present invention relate generally to methods and systems adapted to cluster categorical data. More specifically, embodiments of the present invention relate to methods and systems adapted to cluster categorical data using subspace bounded recursive clustering.

2. Discussion of the Related Art

Data is often organized in a clustering process by separating an arbitrary dataset into a plurality of subsets (i.e., clusters) according to some inherent similarity measure between data within the dataset, wherein data within a particular cluster is characterized by some common trait or attribute. Subsequently, category labels are generated using the clusters and a classifier for the dataset is constructed using the category labels. Clustering processes can be characterized according to the manner in which they form clusters. Two common clustering techniques include partitional and hierarchical techniques.

Partitional clustering techniques organize a dataset into a single collection of clusters that usually do not overlap, wherein data within each cluster is uniformly similar. Hierarchical clustering algorithms, on the other hand, create a hierarchy of clusters representing a range (e.g., from coarse to fine) of intra-cluster similarity. Hierarchical clustering algorithms are generally classified according to the manner in which they construct the cluster hierarchy. Thus, agglomerative hierarchical clustering algorithms build the cluster hierarchy from the bottom up by progressively merging smaller clusters into larger clusters while divisive hierarchical clustering algorithms build the hierarchy from the top down by progressively dividing larger clusters to form smaller clusters.

Generally, clustering algorithms work well when the dataset is numerical (i.e., when data within the dataset are all related by some inherent similarity metric or natural order). Numerical datasets often describe a single attribute or category. Categorical datasets, on the other hand, describe multiple attributes or categories that are often discrete, lacking a natural similarity measure between them. From the clustering perspective this also implies that the centroid of a cluster in a categorical dataset is an undefinable entity. Therefore, categorical data is usually not effectively clustered using partitional clustering techniques. Hierarchical clustering is somewhat more effective than partitional clustering techniques, but its usefulness is limited to simple pattern-matching applications due to the inherent sparsity. Moreover, because categorical datasets often have a high sparsity, measures of intra-cluster similarity is often negligible as intra-cluster dissimilarity is significantly more predominant, thereby preventing hierarchical clustering algorithms from providing meaningful numerical quantities from the categorical dataset.

For example, one type of categorical data (e.g., electronic program guide (EPG) data) contains an attribute (e.g., a descriptor field) that contains text from an unrestricted vocabulary. If text from this attribute is used in projecting the data onto a vector space, then the dimension of the vector space can quickly attain a high dimension (e.g., with O(1000) features) and sparse in that vectors within the dataset typically have more than 99% of their components equal to zero. For example, a typical EPG dataset may include 2,154 records, wherein the descriptor fields of the records collectively contain 2,694 unique terms. The average number of appearances of a term per record is 4.3. But this average is skewed upwards by a small number records (e.g., 2%) having a large number (e.g., 30 or more) of terms (i.e., nonzero features in the term vector). 56% of the records have 3 or fewer terms, resulting in a dataset having a sparsity of at least $3/2694 \approx 99.9\%$. 76% of the records have 5 or fewer terms, giving a sparseness of at least $5/2694 > 99.8\%$.

Accordingly, it would be beneficial to organize categorical datasets according to a process that: 1) reduced the degree of discreteness between attributes or categories; and 2) reduced the sparsity of the dataset that is ultimately organized.

SUMMARY

Several embodiments disclosed herein advantageously address the needs above as well as other needs by providing a method and system for subspace bounded recursive clustering of categorical data.

One embodiment describes a computerized method of representing a dataset that defines an attribute space. First, the attribute space is decomposed into a plurality of attribute subspaces. Next, a parent taxonomy of the dataset is generated with respect to one of the plurality of attribute subspaces, wherein the parent taxonomy organizes the dataset into a plurality of data subsets. Next, a child taxonomy is generated with respect to another one of the plurality of attribute subspaces, wherein the child taxonomy organizes each of the plurality of data subsets within the parent taxonomy into at least one data subset. The generation of child taxonomies is iteratively repeated until a predetermined termination condition is satisfied. Accordingly, the child taxonomy generated in a preceding iteration is treated as the parent taxonomy in a current iteration. Category labels can also be assigned to the generated data subsets.

Another embodiment describes a computer program product including a computer usable medium having computer readable code embodied therein for causing a computer to effect obtaining a dataset defining an attribute space. The computer readable code is also adapted to cause the computer to decompose the attribute space into a plurality of attribute subspaces. Once the attribute space is decomposed, the computer readable code is further adapted to cause the computer to generate a parent taxonomy of the dataset with respect to one of the plurality of attribute subspaces, wherein the parent taxonomy organizes the obtained dataset into a plurality of data subsets. Once the parent taxonomy is generated, the computer readable code is further adapted to cause the computer to generate a child taxonomy with respect to another one of the plurality of attribute subspaces, wherein the child taxonomy organizes each of the plurality of data subsets within the parent taxonomy into at least one data subset. The computer readable code is further adapted to cause the computer to iteratively repeat the generation of child taxonomies until a predetermined termination condition is satisfied. Accordingly, the child taxonomy generated in a preceding iteration is the treated as the parent taxonomy in a current iteration. The computer readable code is also further adapted to cause the computer to assign category labels to the generated data subsets.

By implementing the embodiments exemplarily described above, the degree of discreteness between attributes or categories within the dataset can be reduced and the sparsity of the dataset is also reduced. Therefore, the accuracy of the resultant taxonomy generated as a result of the subspace bounded recursive clustering technique can be maximized.

BRIEF DESCRIPTION OF THE DRAWINGS

The above and other aspects, features and advantages of several embodiments exemplarily described herein will be more apparent from the following more particular description thereof, presented in conjunction with the following drawings.

FIG. 4 illustrates an exemplary ontology onto which records containing categorical data are mapped in accordance with embodiments of the present invention.

Figure 1:
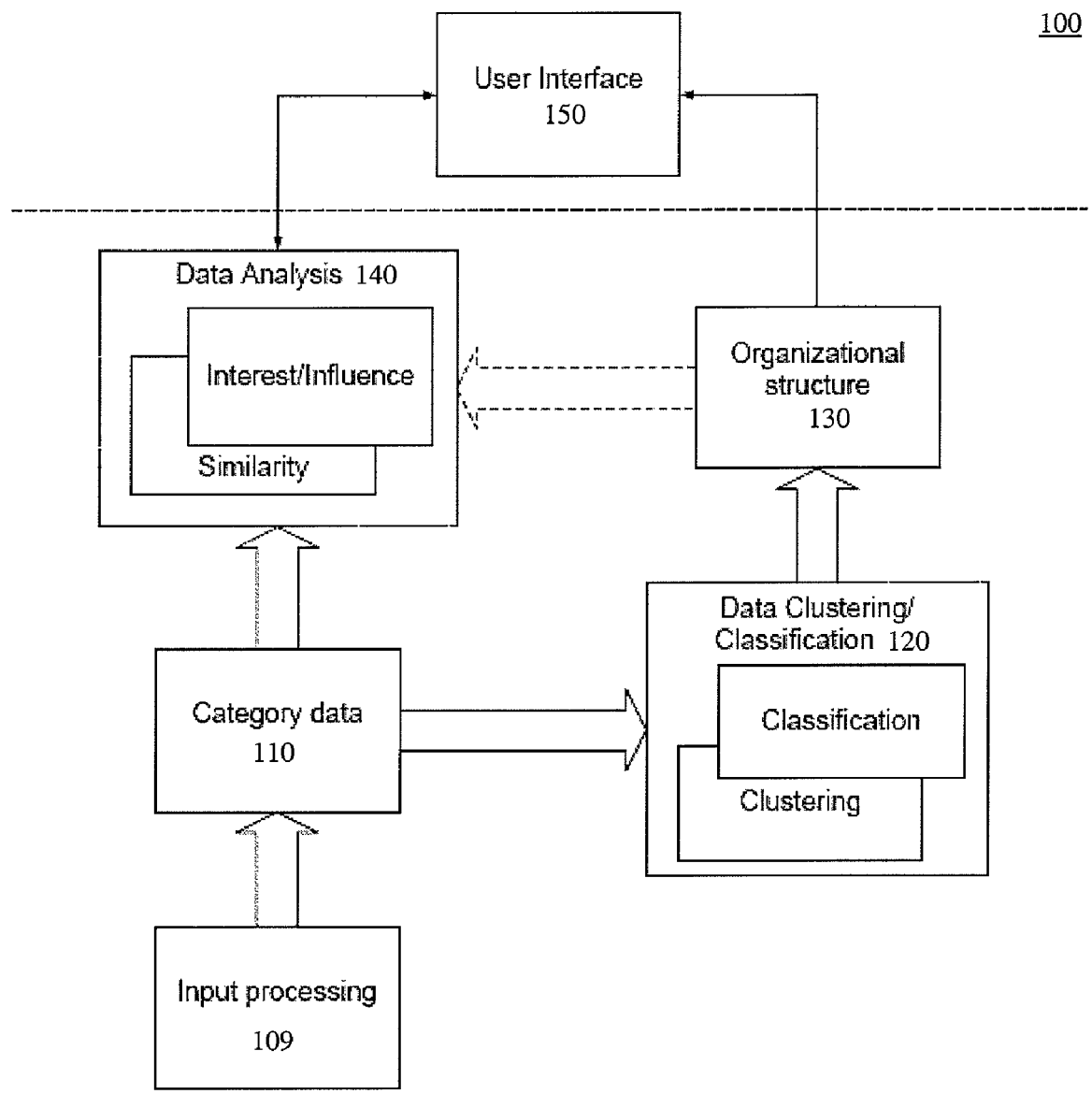
FIG. 1 illustrates a diagram of a system for assisting a user in searching and automatically organizing information.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. It is to be understood that other embodiments may be utilized and that logical, mechanical, electrical and other changes may be made without departing from the spirit or scope of the numerous disclosed embodiments of the present invention. The scope of the numerous disclosed embodiments of the present invention should be determined with reference to the claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It will be appreciated that more or fewer processes may be incorporated into the methods illustrated in the flow diagrams discussed below without departing from the scope of the numerous disclosed embodiments of the present invention. Describing the methods by reference to a flow diagram enables one skilled in the art to develop such programs including such instructions to carry out the methods on suitably configured hardware platforms and operating environments. The computer-executable instructions may be written in a computer programming language or may be embodied in firmware logic. If written in a programming language conforming to a recognized standard, such instructions can be executed on a variety of hardware platforms and operating environments and for interface to a variety of operating systems. In addition, embodiments of the present invention are not described with reference to any particular programming language. It will be appreciated that a variety of programming languages may be used to implement the teachings of the disclosed embodiments.

FIG. 1 illustrates a diagram of a system 100 for assisting a user in searching and automatically organizing information, such as content, which can be characterized by categorical data 110. Such content may be, for example, recorded TV programs, electronic program guide (EPG) entries, and multimedia content. The system 100 may further assist the user in tracking preferences of the user, and may also provide recommendations to the user. The system 100 can further be used by the user to search by example and/or by query.

As shown in FIG. 1, the system 100 includes an input processing module 109, a clustering/classification module 120, a data analysis module 140, and a user interface 150. Also shown in FIG. 1 are categorical data 110 and an organizational structure 130.

Categorical data describes multiple attributes or categories. Often the categories are discrete and lack a natural similarity measure between them. The system 100 includes an input processing module 109 to pre-process input data into categorical data and load the categorical data 110.

The categorical data 110 is grouped into clusters, and/or classified into folders by the clustering/classification module 120. The category and classification methods described herein can operate on any arbitrary categorical dataset. Generally, clustering of categorical data 110 is the process of identifying a set of underlying patterns in categorical data points within a data set and grouping the data points into one or more groups or clusters based on some measure of similarity. Therefore, the process of clustering categorical data conceptually results in the generation of a summary of the categorical dataset, the accuracy of which inherently depends on the amount of information that is retained after the clustering process is complete. According to numerous embodiments disclosed herein, the clustering/classification module 120 can cluster the categorical data 110 by using subspace bounded recursive clustering techniques. By implementing the subspace bounded recursive clustering techniques disclosed herein, the degree of discreteness between attributes or categories within the categorical dataset is reduced and the sparsity of the categorical dataset is also reduced. Therefore, the accuracy of the summary of the categorical dataset generated as a result of the subspace bounded recursive clustering technique is maximized.

The knowledge of category distribution obtained in the process of clustering is used to construct a classifier for some data spaces. Classification is the task of assigning data points to one or more of the identified categories based on some predefined proximity or divergence measure.

In one embodiment, the clustering/classification module 120 uses a folder-based classification system. The folder-based classification system allows a user to build a classifier by creating a group of folders. Each folder within the group is instantiated by a number of exemplary categorical data records.

In one embodiment, one or more of the exemplary records may be input by the user. Accordingly, a group of folders created by the user may act as a classifier such that new categorical data records are compared against the user-created group of folders and automatically sorted into the most appropriate folder. The folder-based classifier automatically creates a collection of folders, and automatically adds and deletes folders to or from the collection. The folder-based classifier may also automatically modify the contents of other folders not in the collection.

The output of the clustering/classification module 120 is an organizational data structure 130, such as a dendrogram, a cluster tree, or a matrix, collectively referred to herein as a taxonomy. A cluster tree may be used as an indexed organization of the categorical data or to select a suitable cluster of the data.

Many clustering applications require identification of a specific layer within a cluster tree that best describes the underlying distribution of patterns within the categorical data. In one embodiment, an output of the clustering/classification module 120 includes an optimal layer that contains a unique cluster group containing an optimal number of clusters.

A data analysis module 140 may use the folder-based classifiers and/or classifiers generated by clustering operations for automatic recommendation or selection of content. The data analysis module 140 may automatically recommend or provide content that may be of interest to a user or may be similar or related to content selected by a user. In one embodiment, the data analysis module 140 assigns categorical data records for new content items with the appropriate folders based on similarity.

A user interface 150 also shown in FIG. 1 is designed to assist the user in searching and automatically organizing content using the system 100.

Although shown in FIG. 1 as specific separate modules, the clustering/classification module 120, organizational data structure 130, and the data analysis module 140 may be implemented as different separate modules or may be combined into one or more modules.

Figure 2:
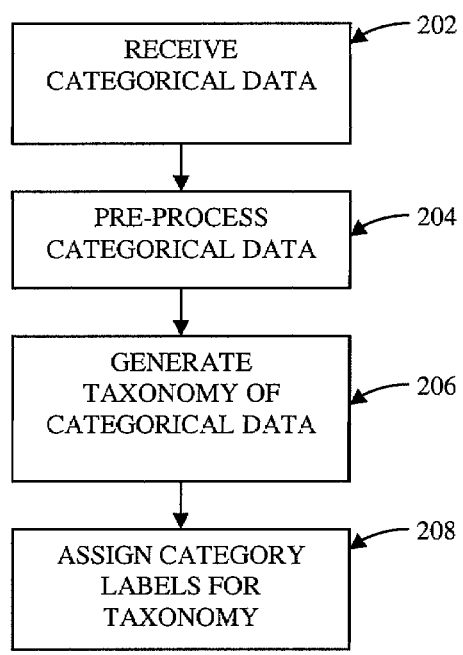
FIG. 2 illustrates an exemplary process of generating a taxonomy of categorical data in accordance with embodiments of the present invention.

FIG. 2 illustrates an exemplary process of generating a taxonomy of categorical data in accordance with embodiments of the present invention.

Referring to FIG. 2, an exemplary process flow of generating a taxonomy of categorical data proceeds as follows: receive input data (202), pre-process the received input data into the aforementioned categorical data (204), generate a taxonomy of the categorical data (206), and assign category labels for the generated taxonomy (208).

In one embodiment, the input categorical data received at 202 includes a plurality of records electronically input into the system 100. As used herein, a record can be a document, a video, photograph, music, or the like, or any combination thereof.

An exemplary process flow of pre-processing the input data at 204 is discussed below with respect to FIG. 3.

Figure 3:
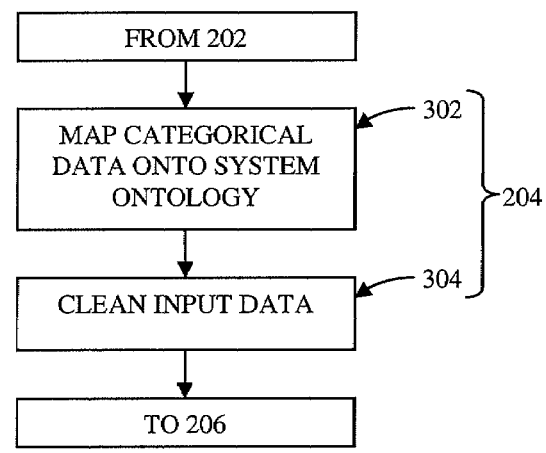
FIG. 3 illustrates an exemplary pre-processing method as applied to categorical data in accordance with embodiments of the present invention.

Referring to FIG. 3, each record is mapped onto a system ontology (302) and the dataset formed from the records is "cleaned" (304).

In one embodiment, records within the received data can be mapped onto predetermined fields of a system ontology at 302. The format of the data, the transformations expected, and the format of the output data are specified in a language designed to describe metadata such as RDF. RDF employs a graph-based data model with a well-defined entailment relation. RDF is expressed in an XML format, the syntax of which explicitly specifies the parameters required and simplifies specification of the transformation process.

FIG. 4 illustrates an exemplary ontology onto which records containing categorical data are mapped in accordance with embodiments of the present invention.

As shown in FIG. 4, the ontology 400 is characterized by a plurality of attributes 402 (i.e., 402a to 402x), wherein each attribute is further characterized by one or more terms 404. In one embodiment, the predetermined ontology adds abstract terms to particular attributes of a record to facilitate processing of the electronic record by the system 100. The ontology thus provides a means for uniformly representing records in a manner that the system 100 can recognize efficiently.

As shown in FIG. 4, a received record can be a document describing a particular television program. Data mapped into a first attribute 402a (i.e., an "identification attribute") corresponds to record identifier (e.g., a particular television program) and is characterized by the term "8498618"; data mapped into another attribute 402d (i.e., a "descriptor attribute") corresponds to keywords for the television program identified in attribute 402a and is characterized by the terms listed from "Best" to "Child"; data mapped into attribute 402n (i.e., a "genre attribute") corresponds to the genre for the television program identified in attribute 402a and is characterized by the terms "Kids" and "Cartoon"; data mapped into other attributes correspond to the date, start time, end time, duration, of the television program identified in attribute 402a and are characterized by the terms "20040410", "0930", "1000", and "30", respectively. In one embodiment, the term "*" represents missing data. In another embodiment, the same term can appear multiple times within the same attribute (e.g., the keyword attribute 402d** contains multiple instances of the term "Family". In the illustrated embodiment, terms such as "0SubCulture" are abstract terms supplemented by the ontology.

Records are represented within the system as vectors. The dimension of each vector corresponds to the total number of terms characterizing all attributes found in all records processed by the system (i.e., the global vocabulary of the system). Values assigned to components of a vector represent the presence of a term within a corresponding record. For example, a vector component can be binarily represented as either a 0 (indicating the absence of a term from a record) or a 1 (indicating the presence of a term in a record).

For example, suppose that the vocabulary for the entire collection of records and attributes (i.e., the global vocabulary) consists of only six terms: A, B, C, D, E, and F. Let a first record $d_1$ include the terms A, B, D, and E and a second record $d_2$ include the terms C, D, and F. Accordingly, the first record $d_1$ can be binarily represented by a six-dimensional vector $d_1=\{1, 1, 0, 1, 1, 0\}$ and the second record $d_2$ can be binarily represented by a six-dimensional vector $d_2=\{0, 0, 1, 1, 0, 1\}$. As shown above, the global vocabulary consists of only six terms. In practice, however, the global vocabulary includes thousands of terms, wherein any particular record includes only a relatively small number of terms. Accordingly, only a relatively few number of vector components are assigned non-zero values. In practice, therefore, records are typically represented as highly "sparse" vectors that can be difficult to process to efficiently generate taxonomies and yield inaccurate results. To increase the efficiency with which taxonomies are generated, and to produce more accurate results, each record is "cleaned" at 304.

In other embodiments, vector components can be numerically represented (as opposed to binarily represented) by a value corresponding to the number of times that a term occurs in a record (i.e., the frequency of the term in the record) or by a normalized value corresponding to the number of times that a term occurs in a record in addition to the total number of terms the record contains (i.e., the normalized frequency of the term in the record). An exemplary process flow of performing the cleaning at 304 is discussed below with respect to FIG. 5.

Figure 5:
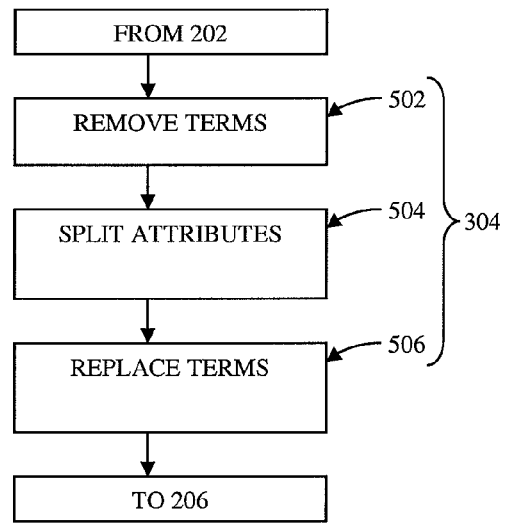
FIG. 5 illustrates an exemplary process of cleaning categorical data in accordance with embodiments of the present invention.

Referring to FIG. 5, a record can be cleaned, for example, by removing terms (502), splitting attributes (504), and replacing terms (506).

In one embodiment, terms can be removed by removing terms from attributes that are not generally useful in generating a cluster set or in classifying records based on the generated cluster set. Non-useful terms can be identified as those that occur infrequently (e.g., once) within a particular attribute of a record. By removing terms from each record, the total number of terms within the attribute vocabulary can be significantly reduced. For example, suppose the system receives 2154 records describing television programs playing over the course of a week. Such a collection of records may include 3016 description keywords, wherein each record contains an average of 5.37 keywords, wherein each keyword occurs an average of 4.29 times, and wherein 1113 keywords occur just once. By removing the keywords occurring just once, the size of the description keyword attribute space can be reduced by about 33%.

In one embodiment, the attributes are split by splitting large record attributes (i.e., attributes characterized by a large number of unique terms) into a plurality of smaller sub-attributes characterized by a smaller number of unique terms. By splitting a large record attribute into small sub-attributes, probabilities can be normalized over smaller, less sparse domains and yield more accurate results. Further, each sub-attribute can be weighted to reflect its relative importance within the record.

In one embodiment, a large attribute can be split into a plurality of smaller sub-attributes by grouping terms within the large attribute based on their frequency of occurrence within the large attribute. In this case, it is assumed that terms occurring more frequently are more relevant, and thus more important, than terms occurring less frequently). As a result, information indicating relevance levels of particular sub-attributes is imparted and used as a weighting value to reflect the relative importance of each sub-attribute. The size and number of the sub-attributes created as a result of the splitting can be controlled, for example, by specifying the proportions of frequencies or value of frequencies desired in each sub-attribute.

In another embodiment, a large attribute can be split into a plurality of sub-attributes by grouping semantically-related terms. In this case, meanings of words may be internally generated or obtained from a lexical reference system such as WordNet, a lexical reference system developed at the Cognitive Science Laboratory at Princeton University. As a result, information indicating a certain degree of "common-sense" is imparted and used as a weighting value to reflect the relevance of each sub-attribute. The size and number of the sub-attributes created as a result of the splitting can be controlled using statistics about particular terms and term frequencies in the attribute. In one embodiment, the total number of occurrences of terms within each sub-attribute can be maintained within a predetermined range to control the degree of relatedness between terms in a particular sub-attribute or to control the abstractness of relationships between terms within a sub-attribute.

In one embodiment, terms that can be grouped together into a sub-attribute according to their semantic interrelatedness are identified using an "is-a" (hypernym) chain relation as applied to nouns.

Consider, for example, the following hypernym chains:

1. cat, feline, carnivore, placental, mammal, vertebrate, chordate, animal, organism, living thing, object, entity
2. dog, canine, carnivore, placental, mammal, vertebrate, chordate, animal, organism, living thing, object, entity
3. umbrella, canopy, shelter, protective covering, covering, artifact, object, entity Based on the first hypernym chain, a cat is a feline, a feline is a carnivore, etc. Based on the second hypernym chain, a dog is a canine, a canine is a carnivore, etc. Based on the third hypernym chain, an umbrella is a canopy, a canopy is a shelter, etc. As shown, the terms 'cat' and 'dog' share the 'carnivore' hypernym relation much earlier in the chain than they share the 'object' hypernym relation with the term 'umbrella'. Accordingly, the term 'cat' is more semantically related to the term 'dog' than it is related to the term 'umbrella'. As a result, a large attribute containing the terms 'cat,' 'dog,' and 'umbrella' will be split into a first sub-attribute containing the terms 'cat' and 'dog' and a second sub-attribute containing the term 'umbrella.' As will be appreciated, semantic relationships between terms changes as the structural taxonomy of the lexical reference system changes or as classes are inserted into or removed from a particular relation path. It will be appreciated, however, that terms other than the nouns appearing in WordNet can be grouped in a separate attribute space and downweighted if necessary.

In the example provided above, where the received records identify television programs, one large attribute may, for example, be divided into two smaller sub-attributes, wherein the first sub-attribute, related to recreation, contains the terms 'Recreation', 'Pachinko', 'Hobby', 'Fun', 'Entertainment', 'Encore', 'Swimming', 'Skating', 'Gymnastics', 'Hunting', 'Fishing', 'Tennis', 'Basketball', 'Golf', 'Soccer', 'Baseball', and 'Athletics' while the second sub-attribute, related to food, contains the terms 'Tofu', 'Food', 'Diet', 'Vitamin', 'Sushi', 'Soup', 'Pudding', 'Dessert', 'Chocolate', and 'Beverage'. In one embodiment, each of the terms identified above can be further divided into smaller sub-attributes according to a semantic relatedness between the terms.

In one embodiment, terms can be replaced by replacing specific terms with equivalent, more abstract terms. In this case, terms found, for example, in WordNet can be replaced with equivalent, more abstract terms. As a result, the number of unique terms characterizing an attribute of a record can be reduced because several specific terms can be mapped onto the same abstract term. Moreover, vector representations of records become much less sparse because each abstract term appears in more records and there are proportionately more abstract terms appearing in each record. The size and number of the sub-attributes created as a result of the term replacements can be controlled using statistics about particular terms and term frequencies in the attribute.

In the example provided above, where the received records identify television programs, the specific terms 'Brother', 'Sister', 'Grandchild', 'Baby', 'Infant', 'Son', 'Daughter', 'Husband', 'Mother', 'Parent', and 'Father' of an attribute can all be mapped onto an equivalent abstract term 'relative'. Similarly, the specific terms 'Hunting', 'Fishing', 'Gymnastics', 'Basketball', 'Tennis', 'Golf', 'Soccer', 'Football', and 'Baseball' of an attribute can all be mapped onto an equivalent abstract term 'sport'.

By cleaning each record as exemplarily described above with respect to FIG. 5, the total number of terms to be processed by the system 100 and/or the sparsity of vectors that represent records can be reduced. As a result, the efficiency with which a taxonomy is ultimately generated by the system 100, and the accuracy of results ultimately yielded may be increased. In one embodiment, the dataset D produced as a result of the pre-processing at 204 contains m records $d_1$, $d_2, \ldots, d_m$ and is characterized by an attribute space containing d attributes, $A_1, A_2, \ldots, A_d$. A generic attribute space $A_i$, where $i=1, \ldots, d$, can be characterized by any combination of $n_i$ unique terms contained within a vocabulary $V_i = \{v_i^1, v_i^2, \ldots, v_i^{n_i}\}$ specific to $A_i$. Accordingly, a global vocabulary V contains n unique terms characterizing the global attribute space A (i.e., a combination of all attributes within the dataset D), such that $n = \sum_{i=1}^{d} n_i$. The dataset D can be represented as an m×n matrix. Accordingly, each row of the m×n matrix corresponds to a vector-space representation of a particular record.

Once the input data has been pre-processed at 204, a taxonomy can be generated at 206. In accordance with numerous embodiments, the taxonomy Γ generated at 206 is obtained as a result of a recursive taxonomy generation process performed on the dataset D obtained resulting from the pre-processing at 204. Generally, the taxonomy generated at 206 organizes the dataset D into a plurality of data subsets (i.e., clusters). An exemplary process flow of a taxonomy generation process (also referred to as a clustering process) is discussed below with respect to FIG. 6.

Figure 6:
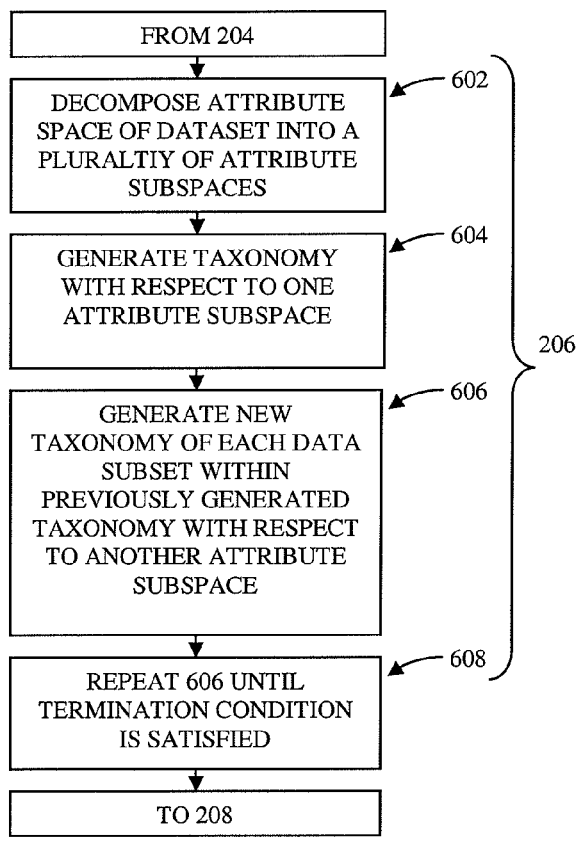
FIG. 6 illustrates an exemplary process of generating a taxonomy in connection with the process shown in FIG. 2.

Referring to FIG. 6, a taxonomy can be generated by, for example, decomposing the attribute space A of the dataset D into a plurality of attribute groups (i.e., subspaces) $G_1, \ldots, G_g$ (602), generating a taxonomy of the dataset D with respect to one of the plurality of attribute groups, thereby generating a plurality of data subsets (604), generating a new taxonomy of each data subset within the previously generated taxonomy with respect to another attribute group of the plurality of attribute groups, thereby further generating a plurality of data subsets for each previously generated data subset (606), and repeating 606 until a predetermined termination condition is satisfied. Once the predetermined termination condition is satisfied, category labels are assigned for the generated taxonomy at 208 (described in greater detail below).

In one embodiment, the attribute space A of D is decomposed into a plurality of attribute groups $G_1, \ldots, G_g$ at 602 such that $\cup_{i=1}^{g} G_i = \{A_1, \ldots, A_d\}$, each attribute group contains at least one attribute (i.e., no attribute group is null). In another embodiment, any two arbitrary attribute groups $G_i$ and $G_j$ do not overlap (i.e., do not share the same attributes—$G_i \cap G_j = 0$). In another embodiment, any two arbitrary attribute groups $G_i$ and $G_j$ overlap by a variable amount (i.e., do share at least some attributes—$G_i \cap G_j = \Phi$). In one embodiment, the attribute space can be manually or automatically decomposed into any number of attribute groups using extrinsic factors (e.g., applied by knowledge engineers) or intrinsic factors (e.g., record features).

In one embodiment, the taxonomy generated at 604 can be performed by generating a taxonomy of the dataset D obtained as a result of pre-processing at 204 with respect to the first attribute group $G_1$. In another embodiment, the taxonomy generated at 606 can be repeatedly performed (pursuant to 608) by generating a taxonomy of the dataset obtained as a result of 604 (or previous iterations of 606) with respect to the second attribute group $G_2$ (or sequentially with respect to consecutively numbered attribute groups $G_2$ to $G_g$). In another embodiment, if the predetermined termination is not satisfied when a taxonomy has been sequentially generated with respect to all attribute groups generated at 602, then a taxonomy may be generated with respect to an attribute group with respect to which a taxonomy has already been generated (e.g., taxonomies can be repeatedly and sequentially generated with respect to attribute groups $G_1$ to $G_g$).

The taxonomy generation process described above with respect to FIG. 6 is both sequential and recursive because a taxonomy is sequentially generated for each attribute group $G_1, \ldots, G_g$ and because a taxonomy generated in a current iteration (i.e., a child taxonomy $\Gamma_i$, where i is an iteration variable representing an iteration count of the taxonomy generation process) organizes the dataset D within a taxonomy obtained immediately prior to the current iteration (i.e., a parent taxonomy $\Gamma_{i-1}$).

According to numerous embodiments, the taxonomy generation process of 206 involves generating a taxonomy $\Gamma_i$ that organizes a dataset D into a plurality data subsets $\{D_{j_i}\}$ (where $1 \leq j_i \leq w_i$, wherein $j_i$ is a subset identification variable for the $j^{th}$ subset present within $\Gamma_i$ generated as a result of the $i^{th}$ iteration). Further, the $w_i$ data subsets are variously distributed across a plurality of sets t of data subsets (where $1 \leq t \leq t_i$). At each iteration i, each data subset $D_{j_i}$ within a particular set t is generated from a data subset $D_{j_{i-1}}$ contained within parent taxonomy $\Gamma_{i-1}$. Accordingly, the total number of sets $t_i$ contained within a child taxonomy $\Gamma_i$ equals the total number of data subsets contained within the parent taxonomy $\Gamma_{i-1}$ (i.e., $t_i = w_{i-1}$, where a particular t in an iteration i corresponds to a particular subset identification variable of the previous iteration, $j_{i-1}$). In one embodiment, each set t contains $x_t$ data subsets $D_{j_i}$, wherein $x_t \geq 1$ and wherein $x_t$, for different sets t within a taxonomy $\Gamma_i$, can be the same or different.

Prior to generating a taxonomy at 604 (i.e., at i=0), the dataset D resulting from the pre-processing at 204 can be characterized as a single, large data subset characterizing, to a very low level of resolution, all of the records $d_1, d_2, \ldots, d_m$ contained therein. Accordingly, the dataset D resulting from the pre-processing at 204 can be represented as a taxonomy $\Gamma_0$ (i=0 because the taxonomy generation process of 206 has not yet started), where $x_t$ and $w_i$ for $\Gamma_0 = 1$.

At 604 (i.e., the first iteration of the taxonomy generation process 206, where i=1), the taxonomy $\Gamma_1$ divides the data subset of $\Gamma_0$ into $t_i$ sets of data subsets $w_i$. Accordingly, $t_i = w_{i-1} = 1$, resulting in a taxonomy $\Gamma_1 = \{D_{j_1}\}$. For purposes of illustration only, let us suppose that $w_i = 2$. Accordingly, $\Gamma_1 = \{D_{j_1}\} = \{D_{1_1}, D_{2_1}\}$. As shown, taxonomy $\Gamma_1$ contains two data subsets (i.e., clusters) that characterize a common subset (i.e., the entire dataset D) with a first degree of resolution higher than that of $\Gamma_0$.

Moreover, when i=2 (i.e., at the second iteration of the taxonomy generation process), the taxonomy $\Gamma_2$ divides the taxonomy $\Gamma_1$ into $t_i$ sets of data subsets $w_i$. Accordingly, $\Gamma_2=\{D_{j_2}\}=\{D_{1_2}, \ldots, D_{xt_{n,2}}\}_1, \{D_{xt_{n+1,2}}, \ldots, D_{w_2}\}_{t_n}, \ldots, \{D_{xt_{i+1}}, \ldots, D_{w_2}\}_{t_i}$, where the first set of data subsets $\{D_{1_2}, \ldots, D_{xt_{n,2}}\}_1$ is generated from the first data subset $D_{1_1}$ contained within taxonomy $\Gamma_1$, the $t_i^{th}$ set of data subsets $\{D_{xt_{i+1}}, \ldots, D_{w_2}\}_{t_i}$ is generated from the with $w_i^{th}$ data subset $D_{w_i}$ contained within taxonomy $\Gamma_1$, $xt_{n,2}$ represents the $xt_{th}$ data subset in the first set of data subsets for taxonomy $\Gamma_2$, $x_{t_{n+1,2}}$ represents the $x_t^{th}$ data subset in an $n^{th}$ intermediate set $t_n$ of data subsets (where $0 \leq n < t_i$), and $w_2$ represents the last data subset in the $t_i^{th}$ set of data subsets for taxonomy $\Gamma_2$. For purposes of illustration only, let us suppose that $w_i=5$. Based on this example and the example provided above, $t_i=w_{i-1}=2$ such that $\Gamma_2=\{D_{j_2}\}=\{D_{1_2}, D_{2_2}\}_1 \{D_{3_2}, D_{4_2}, D_{5_2}\}_2$. Accordingly, taxonomy $\Gamma_2$ contains first and second sets of data subsets $\{D_{j_2}\}_1$ and $\{D_{j_2}\}_2$, respectively, wherein the first set of data subsets contains two data subsets generated from the first data subset of $\Gamma_1$ (i.e., $D_{1_1}$), wherein the second set of data subsets contains three data subsets generated from the second data subset of $\Gamma_1$ (i.e., $D_{2_1}$), and wherein all five data subsets within $\{D_{j_2}\}$ characterize the entire dataset D with a second degree of resolution, higher than the first degree of resolution.

As will be appreciated, each time a taxonomy is iteratively generated at 606, pursuant to 608, an increasing number data subsets (i.e., clusters) is generated. For example, at a third iteration where i=3, and based on the examples provided above, $t_i=w_{i-1}=5$. Moreover, let us suppose for purposes of illustration only, that $w_i=15$. Accordingly, taxonomy $\Gamma_3$ would contain first to fifth sets of data subsets $\{D_{j_3}\}_1, \ldots \{D_{j_3}\}_5$, wherein the data subsets $D_{1_3}$ to $D_{15_3}$ are variously distributed across the five sets of data subsets.

Because each data subset (i.e., cluster) $D_{j_i}$ characterizes the underlying dataset D resulting from the pre-processing at 204, the amount of data (i.e., number of records) organized within a particular data subset $D_{j_i}$ contained within a particular child taxonomy $\Gamma_i$ becomes less than or equal to the amount of data within each data subset $D_{j_{i-1}}$ within its parent taxonomy $\Gamma_{i-1}$. In one embodiment, a taxonomy can be iteratively generated at 606, pursuant to 608, until the taxonomy $\Gamma_i$ represents the underlying dataset D resulting from the pre-processing at 204 with a desired degree of resolution (i.e., until the taxonomy $\Gamma_i$ contains a desired number of data subsets (i.e., clusters) $D_{j_i}$. An exemplary process flow of 604 and 606 will now be discussed below with respect to FIG. 7.

Figure 7:
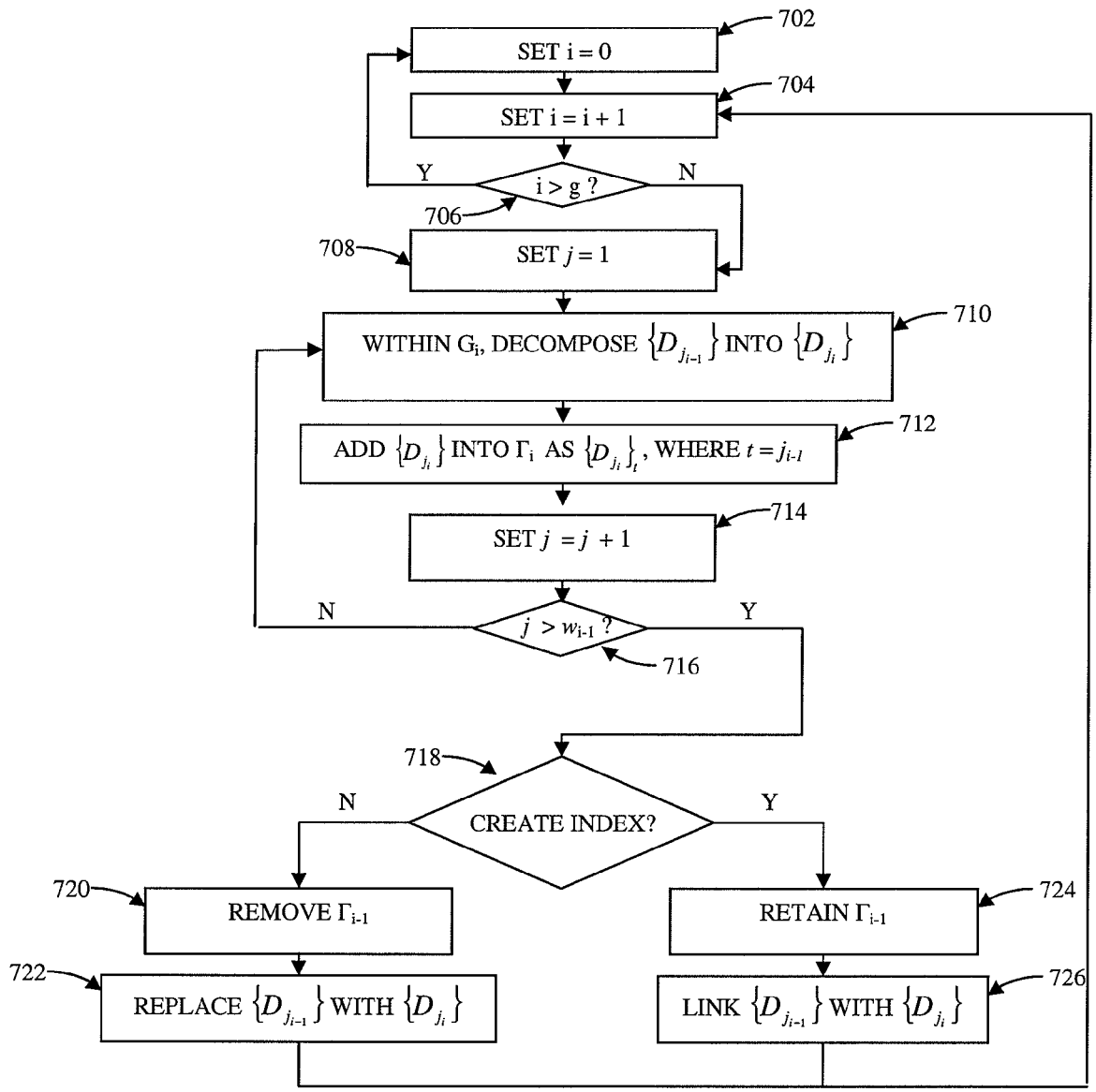
FIG. 7 illustrates an exemplary subspace bounded recursive taxonomy generation process in connection with the process shown in FIG. 6.

Referring to FIG. 7, the aforementioned iteration variable, i, is set to zero (702), incremented by one (704), and a determination is made as to whether the incremented iteration variable exceeds the total number of attribute groups, g, generated as a result of 602.

Generally, the iteration variable i, will be initially incremented at 704 in connection with aforementioned process of generating a taxonomy at 604 and will, therefore, be less than g. Accordingly, the process proceeds to 708 where a generic subset identification variable, j, is set to one and, at 710 the $j^{th}$ data subset organized within parent taxonomy $\Gamma_{i-1}$ (i.e., $D_{j_{i-1}}$) is decomposed into a first new set of data subsets $\{D_{j_i}\}_1$, where $t=j_{i-1}=1$.

$D_{j_{i-1}}$ can be decomposed into a set of data subsets $\{D_{j_i}\}$ by any suitable method. For example, $D_{j_{i-1}}$ can be decomposed according to a clustering process that results in the generation of a set of data subsets $\{D_{j_i}\}$. In one embodiment, the clustering process can be a hierarchical clustering process. In another embodiment, the hierarchical clustering process can be a hierarchical agglomerative clustering process. The hierarchical agglomerative clustering process can be performed in substantially any desired manner. For example, the hierarchical agglomerative clustering process can be performed as exemplarily described in application Ser. No. 11/457,090 (U.S. Pat. No. 7,844,557) entitled "METHOD AND SYSTEM FOR ORDER INVARIANT CLUSTERING OF CATEGORICAL DATA," application Ser. No. 11/457,103 (U.S. Pat. No. 7,761,394) entitled "AUGMENTED DATASET REPRESENTATION USING A TAXONOMY WHICH ACCOUNTS FOR SIMILARITY AND DISSIMILARITY BETWEEN EACH RECORD IN THE DATASET AND A USER'S SIMILARITY-BIASED INTUITION," and/or application Ser. No. 11/457,115 (U.S. Pat. No. 7,664,718) entitled "METHOD AND SYSTEM FOR SEED BASED CLUSTERING OF CATEGORICAL DATA USING HIERARCHIES," all of which are incorporated by reference as if fully set forth herein. All of the aforementioned hierarchical agglomerative clustering processes generate a hierarchy of sets of data subsets (i.e., clusters). After the hierarchy has been suitably generated, a particular set of data subsets (i.e., a layer of clusters within the hierarchy) can be selected according to any suitable method (e.g., as exemplarily described in application Ser. No. 11/457,095 (U.S. Pat. No. 7,640,220) entitled "OPTIMAL TAXONOMY LAYER SELECTION METHOD," which is incorporated by reference as if fully set forth herein), wherein the selected layer of clusters within the generated hierarchy becomes the new set of data subsets $\{D_{j_i}\}$. In another embodiment, an existing data set $D_{j_{i-1}}$ can be decomposed into a set of data subsets $\{D_{j_i}\}$ according to a non-hierarchical clustering process. An exemplary non-hierarchical clustering process that may be used in conjunction with the present invention is described in application Ser. No. 11/457,107 (U.S. Pat. No. 7,630,946) entitled "SYSTEM FOR FOLDER CLASSIFICATION BASED ON FOLDER CONTENT SIMILARITY AND DISSIMILARITY," which is incorporated by reference as if fully set forth herein.

The new set of data subsets $\{D_{j_i}\}$ obtained as a result of 710 is then added into taxonomy $\Gamma_i$ (712), the generic subset identification variable j is incremented by one (714), and a determination is made as to whether a value of the incremented generic subset identification variable j exceeds the a value corresponding to the total number of data subsets $w_{i-1}$ organized within the parent taxonomy $\Gamma_{i-1}$ (716). When 716 is initially performed, (i.e., when i is initially set to 1 at 704) the data subset that has been decomposed at 710 is the entire dataset D resulting from the pre-processing at 204. Accordingly, $w_{i-1}$ (i.e., $w_0$) for D is 1 and the incremented generic subset indication variable j obtained as a result of initially performing 716 will always exceed $w_0$ and the process flow proceeds to 718 where it is determined whether an index needs to be created for the dataset D. When, as a result of 716, it is determined that the value of the incremented subset identification variable j does not exceed $w_{i-1}$ (e.g., after the initially incremented iteration variable i has been incremented a second time), the process is directed back to 710 where the $j^{th}$ data subset $D_{j_{i-1}}$ organized within parent taxonomy $\Gamma_{i-1}$ is decomposed into a another new set of data subsets $\{D_{j_i}\}_t$, where $t=j_{i-1}$.

Depending on whether or not an index needs to be created for the dataset D generated at 204, the process follows one of two paths from 718. If an index is not to be created for the dataset D, then the process flow proceeds to 720 where the parent taxonomy $\Gamma_{i-1}$ is removed and the parent data subsets $\{D_{j_{i-1}}\}$ are replaced with the child data subsets $\{D_{j_i}\}$ (722). If, however, If an index is to be created for the dataset D, then the process flow proceeds to 724 where the parent taxonomy $\Gamma_{i-1}$ is retained and each set of data subsets $\{D_{j_i}\}$ within the child taxonomy $\Gamma_i$ is linked to a corresponding data subset $D_{j_{i-1}}$ within the parent taxonomy $\Gamma_{i-1}$ (726). By linking data subsets generated in a previous iteration with corresponding sets of data subsets generated in a subsequent iteration, a hierarchical-type index of the dataset D can be generated. After 724, the process is directed back to 704 where the iteration variable i is incremented by one, signifying the beginning of a new iteration in the taxonomy generation process. If the incremented iteration variable i attains a value greater than g, the process is redirected back to 702 where the iteration variable i is reset to zero and the taxonomy generation process described above can be repeated, wherein all procedures are based off of the most recent values of i (or i–1).

After the taxonomy has been created at 206, category labels are assigned to each data subset (i.e., cluster) within the taxonomy at 208. In one embodiment, each category label is descriptive of the contents of the data subset it is assigned to and can be assigned manually and/or automatically by the system by any known means. In another embodiment, the category label for each cluster corresponds to the centroid of that data subset.

The taxonomy generated according to the process described above can be used in various ways. For example, the taxonomy can be used as an indexed organization of the categorical dataset or a particular taxonomy $\Gamma_i$ can be used to characterize and classify the categorical dataset. An exemplary process of classifying records within the categorical dataset can include treating the selected taxonomy layer as a nearest neighbor classifier.

As all taxonomies generally represent a summary of the dataset from, the accuracy of the summary inherently depends on the amount of information that is retained within the taxonomy. Since the taxonomy generation process described above produces taxonomies based on groups of attributes, the degree of discreteness between attributes or categories within the dataset D is reduced and the sparsity of the dataset D from which the taxonomy is generated is also reduced. Therefore, the accuracy of the summary of the dataset D generated by the taxonomy is maximized.

While embodiments of the present invention herein disclosed have been described by means of specific examples and applications thereof, numerous modifications and variations could be made thereto by those skilled in the art without departing from the scope of embodiments of the present invention set forth in the claims.

What is claimed is:

1. A computerized method for organizing media content, comprising:
receiving a plurality of records corresponding to media content at a computer, the records each containing categorical data;
obtaining a categorical dataset by mapping each of the plurality of records onto predefined fields of a system ontology, wherein the ontology fields correspond to an attribute space comprising a plurality of attributes each characterized by a plurality of terms, the dataset characterized by the attribute space, the dataset being unsorted;
modifying the dataset, wherein the modifying the dataset comprises modifying one or more of the plurality of terms characterizing one or more of the plurality of attributes of the attribute space;
decomposing the attribute space into a plurality of attribute subspaces each comprising one or more of the plurality of attributes;
generating a parent taxonomy of the modified dataset with respect to one of the plurality of attribute subspaces, the parent taxonomy organizing the modified dataset into a plurality of data subsets;
generating a child taxonomy with respect to another one of the plurality of attribute subspaces, the child taxonomy organizing each of the plurality of data subsets within the parent taxonomy into at least one data subset;
iteratively repeating generating the child taxonomy until a predetermined termination condition is satisfied, wherein the child taxonomy of a preceding iteration is the parent taxonomy of the current iteration; and
assigning category labels to the data subsets.

2. The method of claim 1, further comprising decomposing the attribute space into a plurality of attribute subspaces such that two attribute subspaces share an attribute.

3. The method of claim 1, further comprising decomposing the attribute space into a plurality of attribute subspaces such that two attribute subspaces do not share an attribute.

4. The method of claim 1, wherein generating a child taxonomy comprises decomposing each data subset of the parent taxonomy into a set, wherein each set comprises at least one data subset.

5. The method of claim 4, wherein decomposing each data subset comprises performing a clustering process with respect to the data subset.

6. The method of claim 5, wherein performing a clustering process comprises performing a hierarchical clustering process with respect to the data subset.

7. The method of claim 6, wherein performing a hierarchical clustering process comprises performing a hierarchical agglomerative clustering process with respect to the data subset.

8. The method of claim 6, wherein performing a hierarchical clustering process comprises selecting a layer of clusters as the set.

9. The method of claim 1, further comprising:
removing the parent taxonomy; and
replacing the removed parent taxonomy with the child taxonomy.

10. The method of claim 1, further comprising:
retaining the parent taxonomy; and
linking data subsets within the parent taxonomy with sets of data subsets within the child taxonomy.

11. A computer program product comprising a computer usable medium storing a set of instructions adapted to be executed by a processor to perform the steps of:
receiving a plurality of records corresponding to media content at a computer, the records each containing categorical data;
obtaining a categorical dataset by mapping each of the plurality of records onto predefined fields of a system ontology, wherein the ontology fields correspond to an attribute space comprising a plurality of attributes each characterized by a plurality of terms, the dataset characterized by the attribute space, the dataset being unsorted;
modifying the dataset, wherein the modifying the dataset comprises modifying one or more of the plurality of terms characterizing one or more of the plurality of attributes;
decomposing the attribute space into a plurality of attribute subspaces each comprising one or more of the plurality of attributes;
generating a parent taxonomy of the modified dataset with respect to one of the plurality of attribute subspaces, the parent taxonomy organizing the modified dataset into a plurality of data subsets;

generating a child taxonomy with respect to another one of the plurality of attribute subspaces, the child taxonomy organizing each of the plurality of data subsets within the parent taxonomy into at least one data subset;

iteratively repeating generating the child taxonomy until a predetermined termination condition is satisfied, wherein the child taxonomy of a preceding iteration is the parent taxonomy of the current iteration; and assigning category labels to the data subsets.

12. The computer program product claim 11, wherein the computer usable medium has computer readable code embodied therein for causing a computer to effect:

decomposing the attribute space into a plurality of attribute subspaces such that two attribute subspaces share an attribute.

13. The computer program product claim 11, wherein the computer usable medium has computer readable code embodied therein for causing a computer to effect:

decomposing the attribute space into a plurality of attribute subspaces such that two attribute subspaces do not share an attribute.

14. The computer program product claim 11, wherein the computer usable medium has computer readable code embodied therein for causing a computer to effect generating a child taxonomy by decomposing each data subset of the parent taxonomy into a set, wherein each set comprises at least one data subset.

15. The computer program product claim 14, wherein the computer usable medium has computer readable code embodied therein for causing a computer to effect decomposing each data subset by performing a clustering process with respect to the data subset.

16. The computer program product claim 15, wherein the computer usable medium has computer readable code embodied therein for causing a computer to effect performing a clustering process by performing a hierarchical clustering process with respect to the data subset.

17. The computer program product claim 16, wherein the computer usable medium has computer readable code embodied therein for causing a computer to effect a hierarchical clustering process by performing a hierarchical agglomerative clustering process with respect to the data subset.

18. The computer program product claim 16, wherein the computer usable medium has computer readable code embodied therein for causing a computer to effect a hierarchical clustering process by selecting a hierarchy layer as the set.

19. The computer program product claim 11, wherein the computer usable medium has computer readable code embodied therein for causing a computer to effect:

removing the parent taxonomy; and
replacing the removed parent taxonomy with the child taxonomy.

20. The computer program product claim 11, wherein the computer usable medium has computer readable code embodied therein for causing a computer to effect:

retaining the parent taxonomy; and
linking data subsets within the parent taxonomy with sets of data subsets within the child taxonomy.

21. The method of claim 1, wherein modifying the dataset comprises dividing an attribute of the plurality of attributes into two or more sub attributes each characterized by a portion of the terms characterizing the attribute.

22. The method of claim 1, wherein modifying the dataset comprises grouping two or more of the plurality of attributes into one attribute characterized by the sum of the terms characterizing the two or more attributes.

23. The method of claim 1, wherein modifying the dataset comprises removing one or more of the terms characterizing one or more of the attributes.

24. The method of claim 1, wherein modifying the dataset comprises replacing one or more of the terms characterizing one or more of the attributes.

* * * * *